United States Patent [19]

Baraff et al.

[11] 4,017,712

[45] Apr. 12, 1977

[54] THERMAL PRINTING DEVICE

[75] Inventors: David Robbin Baraff, Robert James Boynton, William Dickson Westwood, all of Ottawa, Canada

[73] Assignee: Northern Electric Company, Limited, Montreal, Canada

[22] Filed: Dec. 8, 1975

[21] Appl. No.: 638,611

[52] U.S. Cl. ............... 219/216; 29/611; 338/308

[51] Int. Cl.[2] ................................. H05B 1/00

[58] Field of Search......................... 29/610, 611, 29/620; 40/28 R, 28 C; 219/216, 543; 338/307, 308; 346/76; 427/103, 112, 427/123–125

[56] References Cited

UNITED STATES PATENTS

| | | | |
|---|---|---|---|
| 3,903,393 | 9/1975 | Stapleton et al. | 219/216 |
| 3,495,070 | 2/1970 | Zissen | 219/216 |

*Primary Examiner*—C. L. Albritton
*Attorney, Agent, or Firm*—Sidney T. Jelly

[57] ABSTRACT

A thermal printing device comprises a continuous bar of electrically resistive material, on a substrate, with first and second patterns of electrical conductors, a pattern on each side of the bar. Connections are made to the bar from the conductor patterns at closely spaced positions. Application of electrical power to the bar at preselected position, via the conductor patterns and connections, produces localized hot spots. The power can be pulsed, and very close spacing of connections to the bar can be provided. By forming the conductor patterns as columns on one side of the bar and as rows on the other side it is possible to provide connections between columns and bar and rows and bar such that the number of external connections is minimized. The conductor patterns, connections and resistive bar can be formed by various methods, for example, thick and/or thin film techniques, and evaporating. The bar can extend the full width of a page, i.e. 8½ inches, on a single substrate.

12 Claims, 4 Drawing Figures

THERMAL PRINTING DEVICE

This invention relates to a thermal printing bar device particularly, but not essentially for, facsimile printing.

Thermal printing devices are known and are in the form of a number of individual, discrete, heating elements, each of which is activated as required. The resolution available from such devices is limited by the minimum spacing which can be obtained.

At present the best resolution available is of the order of .02 inch. For high resolution, such as is required for facsimile printing, resolutions down to .005 inch is desirable. Such high resolution is desired when printing out drawings, pictures and small type transmitted over telecommunications systems.

It is desirable also to be able to print a full page width, and the speed of printing should be at a reasonable level. As the paper used in the printing is darkened by heat, it is necessary to generate sufficient heat, for a sufficient length of time, to produce the desired density of printing.

The above features, and others, will be considered further in the description following, together with other features and advantages. The present invention meets the various requirements by forming the printing—or heating—element in the form of a continuous bar of electrical resistance material, and applying electrical pulses across the bar at preselected positions to provide "hot spots."

Thus in accordance with the present invention, a thermal printing device comprises; a substrate of electrically insulating material; a continuous bar of electrically resistive material on a surface of the substrate; a first pattern of electrical conductors on the surface of the substrate and extending along one side of the bar; a second pattern of electrical conductors on the surface of the substrate and extending along the other side of the bar; first electrical connectors from the first pattern to the bar, the first electrical connectors connected to the bar in a closely spaced predetermined arrangement extending along the bar; second electrical connectors from the second pattern to the bar, the second electrical connectors connected to the bar at the other side in a closely spaced predetermined arrangement extending along the bar and opposed to the first electrical connectors; and means for connecting an electrical power supply to the patterns of electrical connections to apply electric current to preselected opposed electrical connectors to produce a heated areas in said bar.

In accordance with a feature of the invention, the first pattern of conductors comprises a plurality of columns, each column electrically separate from other columns, and a plurality of connectors extending from each column to the bar; and the second pattern of conductors comprises a plurality of rows, each row electrically separate from other rows, and a plurality of connectors extending from each row to the bar, each connector from a row connected to the bar opposite a connector connected to a different one of the columns, each row connected by the connectors to the bar at positions different from each other row.

The invention will be readily understood by the following description of various embodiments, by way of example, in conjunction with the accompanying drawings, in which.

Figure 1:
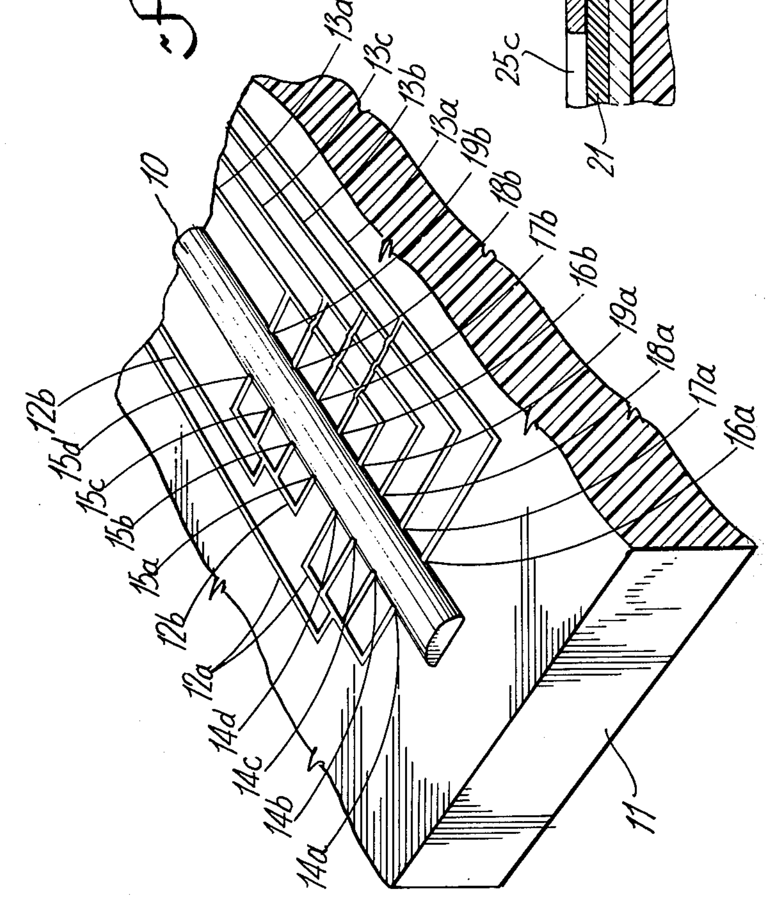
FIG. 1 is a diagrammatic perspective view of part of a printing bar to illustrate the basic features of the invention.

As illustrated in FIG. 1, a single long continuous electrically resistive bar 10 is positioned on a substrate 11 of electrically insulating material. A first series or pattern of conductors 12*a*, 12*b* is provided on one side of the bar 10 and a second series or pattern of conductors 13*a*, 13*b*, 13*c*, 13*d* . . . is provided on the other side of the bar 10.

Taking the conductor pattern 12*a*, it divides, in the present example, into four to connect to the bar 10 at four closely spaced positions 14*a*, 14*b*, 14*c* and 14*d*. Conductor pattern 12*b* similarly divides into four and connects to the bar 10 at positions 15*a*, 15*b*, 15*c*, 15*d*.

Conductor pattern 13*a* is connected to the bar 10 at a position 16*a*—immediately opposed to position 14*a*. Pattern 13*a* is also connected to bar 10 at position 16*b*—immediately opposed to position 15*a*. Conductor pattern 13*b* is connected to the bar 10 at positions 17*a* and 17*b*—opposite positions 14*b* and 15*b*; conductor pattern 13*c* is connected to positions 18*a* and 18*b*—opposite positions 14*c* and 15*c*; and conductor pattern 13*d* is connected to positions 19*a* and 19*b*—opposite positions 14*a* and 15*d*. The connections from patterns 13*a*, 13*b* and 13*c* to position 16*b*, 17*b* and 18*b* respectively are made via insulated crossovers, under or over conductor patterns 13*b*, 13*c* and 13*d*.

By applying an electrical pulse to conductor patterns 12*a* and 13*a*, a "hot spot" occurs between positions 14*a* and 16*a*. Because of the resistivity of the material of the bar 10 and the following of the shortest path, passage of electrical power is restricted to a direct path between positions 14*a* and 16*a* and the heating is very localized. An electrical pulse to patterns 12*a* and 13*b* will create a "hot spot" between positions 14*b* and 17*a* and a pulse to patterns 12*b* and 13*a* will create a "hot spot" between positions 15*a* and 16*b*. Other pulse arrangements can readily be appreciated from FIG. 1. The number of patterns can be increased, and are increased for a full page line, as will be described.

Figure 2:
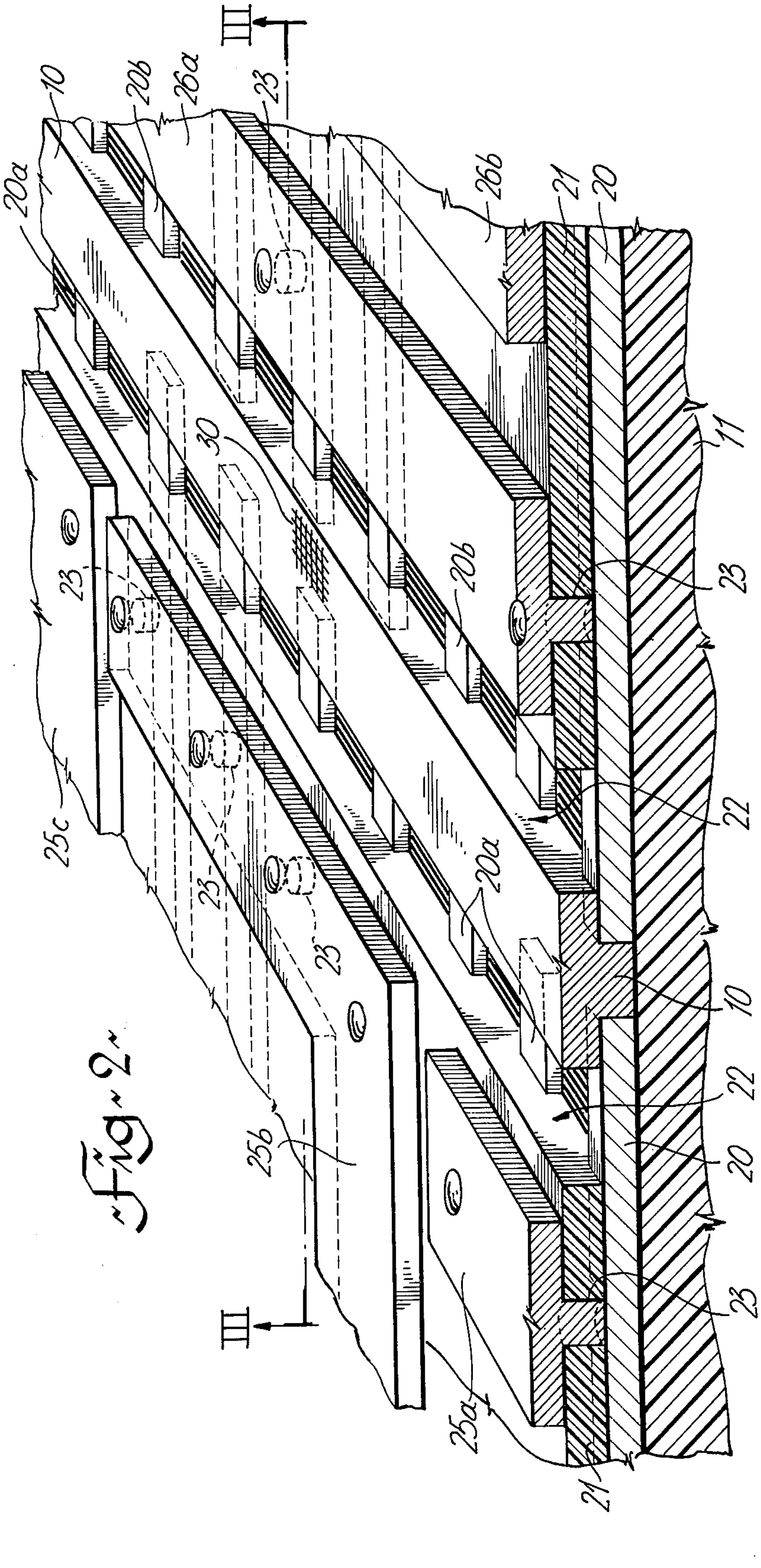
FIG. 2 is a less diagrammatic perspective view and cross-section of a part of a printing bar illustrating the structural details.

FIG. 2 illustrates a typical structure for a printing bar and associated conductors in more detail. The substrate 11 is of suitable electrically insulating material, for example glass, quartz or ceramic. On the top surface of the substrate 11 is deposited, or formed, a layer, for example a thin-film layer 20, of electrically conductive material. An example is a three part layer composed of a first layer of titanium for good adhesion to the substrate, a second layer of palladium which gives good adhesion to the titanium and provides good adhesion for the third layer of gold. The three layers are formed by evaporation, for example, with a typical thickness for the gold layer of about 1000 Å. and a total thickness for the layer 20 of less than 2000 Å.

The layer 20 is then photolithographically etched to define connections 20*a* and 20*b*. The whole is then covered with a layer 21 of electrically insulating material. This layer is applied by, for example, silk screen process and there is left uncovered a longitudinal opening 22 which extends down to the substrate between the ends of the connections 20*a* and also leaves the ends of the connections 20*a* exposed. The opening 22 extends for the full length of the substrate.

As an example the layer 21 is a thick film layer, typically formed by double screening—two layers one on top of the other, to give a typical thickness of 25 microns. The layer 21 can be formed by other means, for example evaporation. The material can vary but conveniently is one which is machineable by a laser. After baking the layer 21—if necessary as with a silk screened layer—vias or holes 23 are opened through the insulating layer 21, in a predetermined pattern of holes, to provide eventual connection to the top layer of conductors. The vias or holes 23 are readily produced on conventional machinery. The laser burns through the layer 21 but not through the conductive layer 20, partly because the gold reflects the beam and also because the power of the laser beam is of sufficient power only to burn through the layer 21. A typical material for the insulating layer 21 is that supplied under the trade name Dupont 9429.

The conductor patterns 25 and 26 are then formed. In the present example, conductor patterns 25 and 26 are thick-film layers, formed, for example, by silk screen process. On one side of the opening 22 the conductor pattern 25 is such that each conductor 25*a*, 25*b*, 25*c* is connected via the holes 23 to a plurality of the connections 20*a*. The connections 20*a* are connected in groups of a predetermined number. On the other side of the opening 22 the conductors pattern 26 comprises a plurality of conductors 26*a*, 26*b* . . . extending the length of the substrate. Each conductor 26*a*, 26*b* . . . is connected to a series of connections 20*b*, such that the connections 20*b* connected to conductor 26*a* are separated by a predetermined number of other connections 20*b*. For example conductor 26*a* can be connected to every fourth connection 20*b*, while conductor 26*b* will also be connected to each fourth connection 20*b* but spaced along one connection relative to conductor 26*a*. This will be seen more clearly in FIG. 4, to be described later. Electrical connection between the conductor patterns 26, that is conductors 26*a* and connections 20*b*, is via the holes 23 in the insulating layer 21. A typical material for thick film conductors is sold under the trade name Dupont 9315.

Finally the bar 10 is formed by, for example, silk screen process to deposit a layer of electrically high resistance material—a typical example is a resistor ink supplied under the trade name Dupont 1431. A typical example of resistivity is 1kΩ/□, but this is by way of example only. This is baked on. If desired, a protective layer can be applied over the conductor patterns, leaving the bar 10 exposed.

The arrangement of FIG. 2 corresponds generally to the arrangement as in FIG. 1, and the same system of applying pulses produces localized hot spots. For example, a pulse applied to conductor 25*b* and 26*a* will produce a hot spot at a position indicated by shaded area 30.

Figure 3:
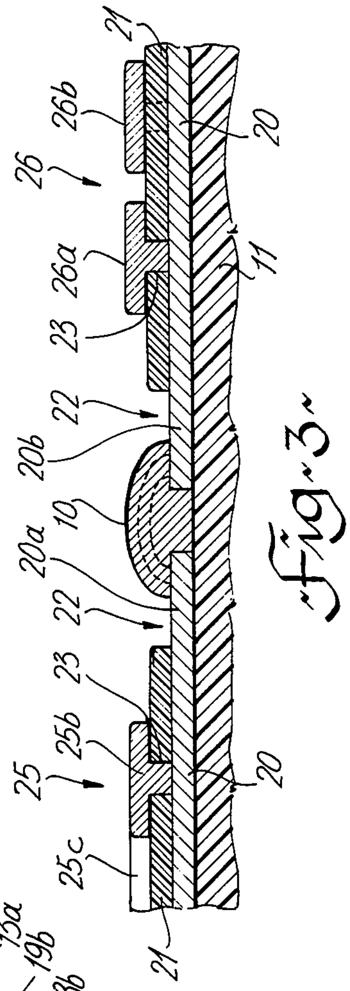
FIG. 3 is a cross-section through the printing bar and some of the associated conductors, as on the line III—III of FIG. 2.

FIG. 3 is a cross-section through a printing bar, as in FIG. 2, transverse to the longitudinal axis of the bar. Although the conductor patterns 25 and 26 and bar 10, are shown in FIG. 2 with square edges, generally they will be rounded, as in FIG. 4, particularly with screen processes. Particularly, the bar 10 will have a rounded profile. The bar 10 has to meet several criteria. There must be a certain "heat content" when pulsed so that it does not cool too quickly. This can require a thickness that is obtained by building up the bar in layers, for example by silk screening two or three times, as indicated by the dotted lines 31. It is desirable that there be uniform heat distribution vertically through the bar, or if any temperature gradient does occur, that the bar is hotter at the top surface, although the temperature should be minimal to obtain maximum "heat content." However, with a thick bar there will be a tendency for more electric current to flow through the lower part of the bar than the top part, giving a higher temperature in the lower part of the bar. This can be offset to a large extent by making each layer of the bar 10 of a different resistance, the resistance of each layer decreasing from the bottom layer to the top layer.

As stated previously, a resolution of .005 inch is desired and therefore the connections 20*a*, and 20*b*, are spaced at .005 inch centers. While the bar 10 can readily be more than .005 inch wide, say .008 to .010 inch wide, the ends of the connections 20*a* and 20*b* extend under the bar, to give good connection and to avoid the requirement for extreme accuracy in the forming of the bar 10, and the actual hot spot is approximately .005 inch wide. Generally, a dot or "hot spot" about .005 inch in diameter is formed.

Figure 4:
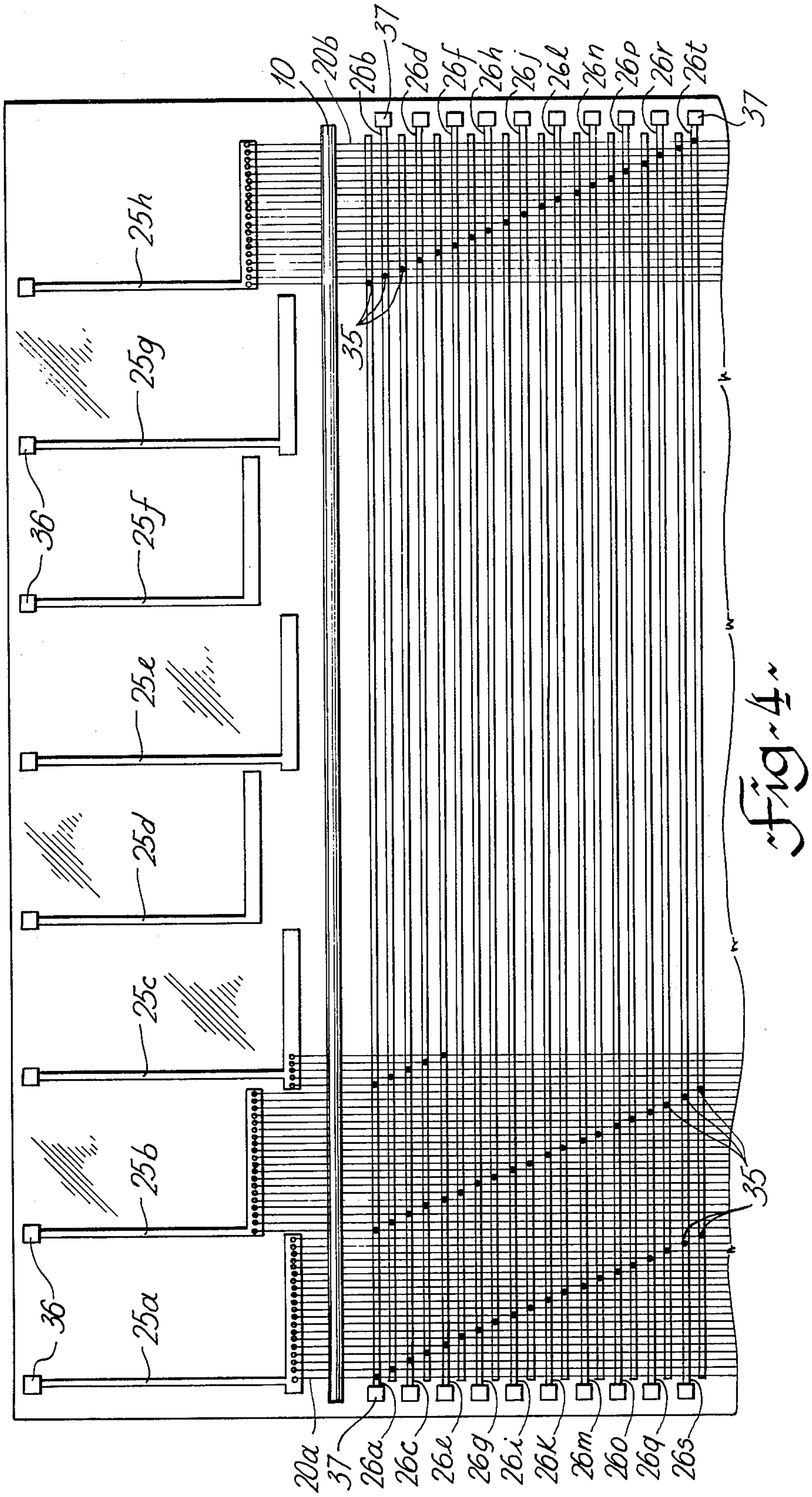
FIG. 4 is a plan view of one form of conductor layout for a printing bar.

FIG. 4 is a plan view of one example of conductor layout for a printing bar. The resistor bar is indicated at 10 and extends continuously across the substrate 11. On one side of the bar 10, to the top in FIG. 4, are formed the conductors 25*a*–25*h*. In the example drawn each conductor 25 connects with twenty connections 20*a*. On the other side of the bar, below the bar in FIG. 4, conductors 26*a*–26*t* are formed. Each conductor 26 is connected to every twentieth connection 20*b*, conductor 26*a* connected to the first, twenty-first, etc., conductor 26*b* connected to the second, twenty-second etc., and so on, as indicated by the dots 35 which correspond to the positions of the vias or holes 23 in FIGs. 2 and 3.

Contact pads 36 are arranged along one edge for the conductors 25, while, for convenience, the conductors 26 have contact pads 37 at alternate ends, to permit of reasonably large contact pads. By the selection of appropriate conductors 25 and 26 a "hot spot" can be produced anywhere along the bar 10.

For convenience and ease of description the patterns 25 are referred to as columns and the patterns 26 are referred to as rows. Thus any particular "hot spot" can be activated by a selection of a particular column and a particular row.

FIG. 4 is illustrative only and the connections 20*a* and 20 would be closer together and there would be more of them. Thus with .005 inch resolution there will be 200 connections per inch, that is 1700 connections for an 8½ inch bar—a page width. In FIG. 4 each conductor 25 has been shown connected to twenty connections 20*a*. Each conductor 26 has been shown connected to eight connections 20*b*. However with more conductors this can change.

Conveniently, each conductor or column 25 and each conductor or row 26 can be connected to the same number of connections 20*a* or 20*b* respectively, for example forty, but this is only a matter of design and convenience and may depend upon various criteria, for example the cost of the transistors used to pulse the conductors.

Other forms of conductor pattern may be used. For example, instead of the conductors 20*a* connected to a particular column 25*a* being immediately adjacent to each other, as in FIG. 4, it is possible to intersperse conductors from two, or more, columns. Suitable insulated cross-overs will be required, but this arrangement can provide for wider conductors 20*a* as adjacent conductors will not be energized.

As a further modification, scribe lines can be made partway or all the way across the bar 10. The scribe lines would not be right through the bar, but only partway. This would assist in restricting current flow, particularly if there is much variation in height and/or width of the bar, i.e. variation in cross-sectional area.

The bar 10 can also be formed by thin film techniques, although several layers are likely to be required to give the desired heat content characteristics.

As an example of printing speed, the previously stated resolution is desired with a time of one minute for the printing of an 8½ x 11 page. The resolution applies both across the page—represented by the spacing of the "hot spots" or dots, produced by the connections 20*a* and 20*b*—and normal to this direction. This represents $3.74 \times 10^6$ resoluable spots per page. The print time for a line is 20 microseconds and a conductor in a line is pulsed for ½ microsecond when printing of a dot is required.

Conventional thermal printers generally use a 7 x 5 matrix, that is thirty-five dots per character. This resolution is much too low for facsimile printing. Developments up to densities of fifty dots per inch have been obtained but the resolution is still not satisfactory for facsimile printing. The present invention enables a four fold increase in dot density.

The paper to be printed is held in contact with the printing bar 10 and can be moving continuously or step by step. The heat content of the bar material is such that even though it is pulsed for only ½ microsecond, the bar remains hot enough, long enough, at the particular dot position, to cause the paper to change colour. The paper used is coated (or impregnated) with a heat sensitive material and a variation in colour depth (gray scale) can be obtained by the provision of control devices to vary the intensity of the pulse applied to the print bar.

Power requirements are reasonable and tests have shown that to print a black page—that is to pulse every dot position for the whole page—power requirements as low as 80 watts can be obtained. However, with improved efficiencies lower power requirements have been obtained.

As a modification, it is possible to heat the substrate continuously (and thus the printing bar) to a temperature just below the printing temperature. The pulses are then of only sufficient power to raise the temperature of the printing bar locally to the printing temperature. This reduces the control power and thus the power required to be handled by the pulsing devices.

The cost of production of the printing bar of the present invention is very much less than producing a large number of individual resistors. The resolution, although described as .005 inch, can be higher, for example down to approximately .003 inch, and can be lower, for example .010 inch if desired. Although it is possible, with considerable care to produce individual resistors which give resolutions of .020 inch or even a little higher, the present invention will provide a printing bar which is easier and cheaper to make.

The bar is produced on a single substrate. Previous thermal printing bars have used several substrates joined together. This requires careful polishing of mating edges and requires extra assembly time. Joining several substrates with a high resolution as required would require extreme accuracy in the positional relationship between conductors and substrate edge. A reduction of external connections is obtained, which reduces assembly time. The ability to drive the print bar to a high temperature by current pulses of less than ½ millisecond enables a reduction in the number of power transistors required, with the use of time multiplex circuitry, and there is less power loss to the substrate. It has been found that steady state operation results in efficiencies as low as 2%, where efficiency is the ratio of power into the paper to electrical power used, expressed in percent. The printing bar and high speed pulsing, as described above, have been found to give efficiencies up to nearly 25%.

What is claimed is:

1. A thermal printing device comprising:

a substrate of electrically insulating material;

a continuous bar of electrically resistive material on a surface of said substrate;

a first pattern of electrical conductors on said surface of said substrate and extending along one side of said bar and first electrical connectors extending from said first pattern to said bar, said first electrical connectors connected to said bar at said one side in a closely spaced predetermined arrangement extending along the bar, said first pattern of electrical conductors comprising a plurality of columns, each column electrically separate from other columns, and a plurality of said first electrical connectors extending side by side from each of said columns to said bar of electrically resistive material;

a second pattern of electrical conductors on said surface of said substrate and extending along the other side of said bar, and second electrical connectors from said second pattern to said bar, said second electrical connectors connected to said bar at said other side in a closely spaced predetermined arrangement extending along the bar and opposed to said first electrical connectors, said second pattern of electrical conductors comprising a plurality of rows, each row electrically separate from other rows, and a plurality of said second electrical connectors extending from each of said rows to said bar, each electrical connector from a row connected to said bar opposite a first electrical connector connected to a single different one of said columns, each row connected by said second electrical connectors to said bar at positions different from each other row;

means for connecting an electrical power supply to said patterns of electrical conductors to apply electric current to preselected opposed electrical connectors to produce heated areas in said bar.

2. A thermal printing device as claimed in claim 1, said continuous bar comprising at least one thick film deposited layer.

3. A thermal printing device as claimed in claim 1, said continuous bar comprising a plurality of superposed layers.

4. A thermal printing device as claimed in claim 1, said first and second patterns of electrical conductors comprising thin film layers deposited on said substrate.

5. A thermal printing device as claimed in claim 1, said first and second electrical connectors comprising thin film layers on said substrate.

6. A thermal printing device as claimed in claim 1, said first and second connectors connected to said bar at a center to center dimension between .003 inch and .010 inch.

7. A thermal printing device as claimed in claim 6, said center to center dimension .005 inch.

8. A thermal printing device as claimed in claim 1, said means for connecting an electrical power supply to said patterns of electrical connectors including means for applying said electrical power as a pulse.

9. A thermal printing device as claimed in claim 8, said pulse of approximately one half millisecond.

10. A thermal printing device as claimed in claim 1, including a layer of heat conductive erosion resistant material over said patterns of electrical conductors.

11. A method of producing a thermal printing device, comprising:

forming a first electrical conductor pattern on a surface of an electrically insulating substrate, on one side of an axis extending across said substrate, said conductor pattern including a plurality of first electrical connectors extending normal to said axis in closely spaced parallel array and a plurality of first conductors electrically separated from each other and defining a plurality of columns, each first conductor connected with a separate predetermined number of first connectors;

forming a second electrical conductor pattern on said surface of said substrate, on the other side of said axis, said second conductor pattern including a plurality of second electrical connectors extending normal to said axis in closely spaced parallel array and a plurality of second conductors electrically separated from each other and defining a plurality of rows, each second conductor connected with a separate predetermined number of second connectors, the first connectors of the first conductor pattern having ends opposed to the ends of the second connectors of the second conductor pattern;

said second electrical conductor pattern formed by forming a layer of electrically conductive material on said surface and defining said layer to form said plurality of second electrical connectors; forming an electrically insulating layer over said second connectors, said insulating layer defined to have said ends of said second connectors exposed; forming openings through said insulating layer, an opening over each of said second connectors and extending through to the connectors, said openings formed in a predetermined pattern for a predetermined electrical connection pattern; forming a second layer of electrically conductive material on said insulating layer, said second conductive layer defined to form said second electrical conductors, each said second electrical conductor electrically connected to a predetermined number of second connectors via said openings in said insulating layers; and forming a continuous bar of electrically resistive material along said axis, said bar overlying said opposed ends of said connectors.

12. A method as claimed in claim 11, said first electrical conductor pattern formed by forming a layer of electrically conductive material on said surface and defining said layer to form said plurality of first electrical connectors; forming an electrically insulating layer over said first connectors, said insulating layer defined to leave said ends of said first connectors exposed; forming openings through said insulating layer, an opening over each of said first connectors and extending through to the connectors, said openings formed in a predetermined pattern for a predetermined electrical connection pattern; said second conductive layer also defined to form said first electrical conductors, each said first electrical conductor connected to a predetermined number of first connectors via said openings in said insulating layer.

* * * * *